UNITED STATES PATENT OFFICE.

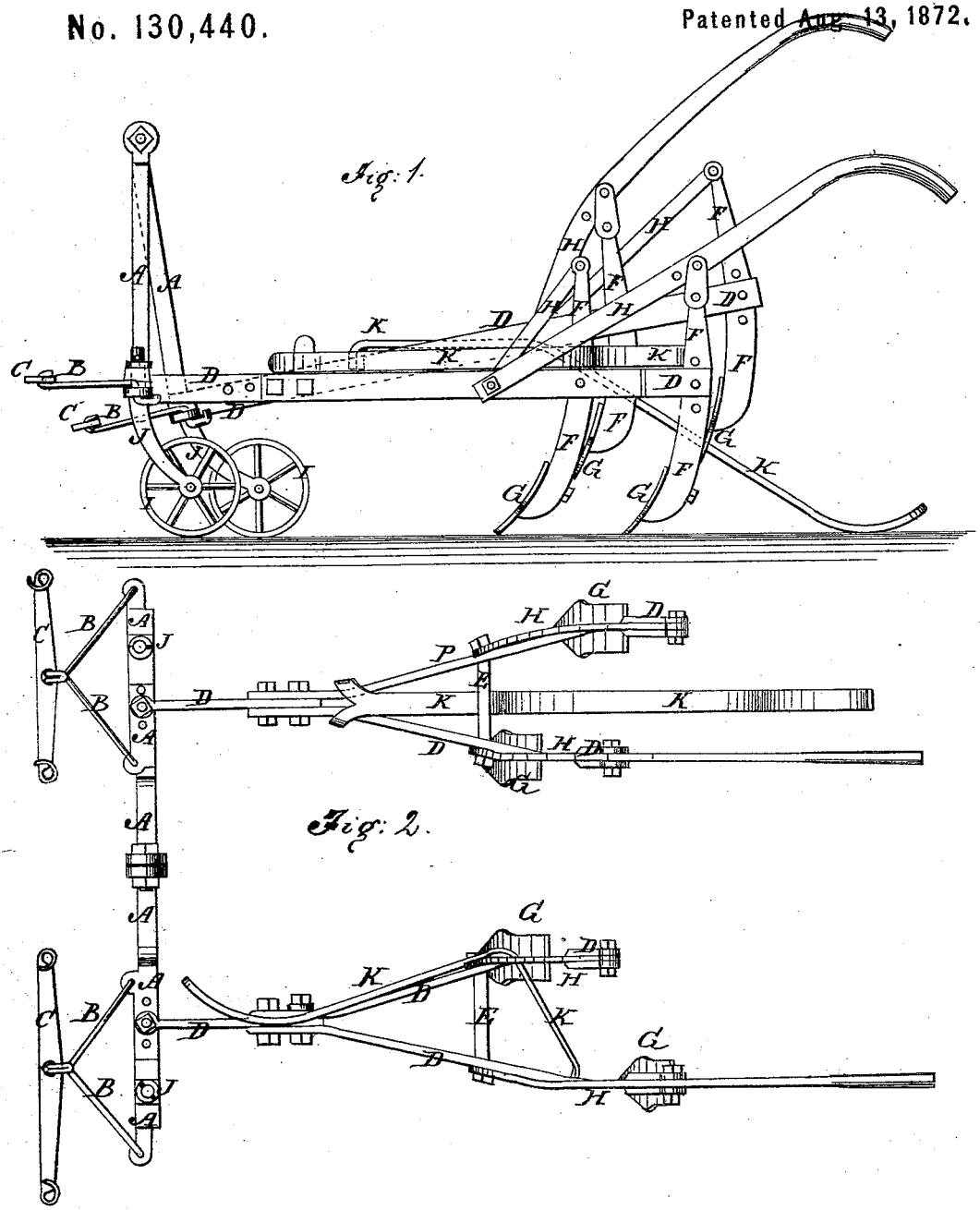

TOTTEN POLING, OF GUTHRIE, IOWA.

IMPROVEMENT IN CULTIVATORS.

Specification forming part of Letters Patent No. 130,440, dated August 13, 1872.

Specification describing a new and useful Improvement in Cultivator, invented by TOTTEN POLING, of Guthrie, in the county of Guthrie and State of Iowa.

Figure 1 is a side view of my improved cultivator. Fig. 2 is a top view of the same.

Similar letters of reference indicate corresponding parts.

My invention has for its object to furnish an improved iron cultivator, simple in construction, convenient in use, and effective in operation, and which shall be so constructed that it may conform to irregularities in the surface of the ground, and may be readily adjusted to run deeper or shallower in the ground, as may be desired; and it consists in the construction and combination of various parts of the cultivator, as hereinafter more fully described.

A are two bars, each of which is bent twice at right angles, and has an ear formed upon its inner end, which ears are secured to each other with a bolt, nut, or key, so that the said bars may turn upon the joint thus formed to enable one of the plows to rise above or drop below the level of the other, thus adapting the cultivator to work upon an uneven surface, and enabling one of the plows to be raised to pass an obstruction without disturbing the other. This construction also forms an arch or rise in the connecting-bar so that the cultivator may cultivate both sides of a row of plants at the same time without injuring or breaking the plants. B are the draft-rods, which have a hook formed upon their middle parts to receive the whiffletrees C. The ends of the rods B are spread apart, and are attached to the outer and inner ends of the lower horizontal parts of the bars A. This mode of attaching the draft leaves the middle parts of said lower horizontal parts free for the attachment of the forward ends of the plow-beams D. The forward ends of the plow-beams D are notched or slotted horizontally to receive the rear edge of the lower horizontal parts of the bars A, to which they are pivoted by a bolt, several holes being formed in the said bars to receive the said pivoting-bolts, so that the plow-beams may be moved farther apart or closer together, as may be desired. This mode of attachment gives the rear ends of the plow-beams a free lateral but no vertical movement. The vertical movement is obtained through the joint between the inner ends of the bars A.

The plow-beams D are each made in three parts, the forward ends of the two rear parts being bolted to the opposite sides of the rear end of the forward part. Several sets of holes are formed to receive the bolts by which the rear parts of the beam D are secured to the forward part, so that the said beams may be lengthened and shortened, as desired. The rear parts of the beams D are made of unequal length, and spread apart and held in their proper relative position by a cross-bar or long bolt, E. The rear ends of the rear parts of the beams D are slotted vertically to receive the standards F, which are secured to said beams by bolts, several holes being formed in the said standards F to receive the said bolts, so that the standards may be raised and lowered to regulate the depth at which the plows work in the ground. To the lower ends of the standards F are attached plows G, which may be of any desired kind. The upper ends of the standards F project above the beams D, and to said ends are bolted the rear ends of the braces H that sustain the draft-strain upon the said standards. The forward ends of the braces H are bolted to the sides of the rear parts of the beams D. The right or left braces of each plow-beam may be extended to the rearward to serve as a handle for the plows, so that the plowman, while guiding the plows, may walk at the side of the row of plants being cultivated. The forward part of the cultivator is sustained by the caster-wheel I, the standards J of which are pivoted to the lower horizontal parts of the bars A near their outer ends. K are bars, the forward ends of which are forked and bent downward to fit upon the rear parts of the beams D, near the forward ends of said parts. The bars K are passed beneath the cross-bars E, and are bent downward and curved rearward to rest upon the ground and serve as drag-bars to support the plows away from the ground when passing from place to place.

When not in use, the bars K are placed upon the beams D. In the drawing, one of the bars K is represented in position for use, and the other as laid upon the beam D.

Having thus described my invention, I claim as new and desire to secure by Letters Patent—

The bars A, constructed substantially as herein shown and described, and pivoted to each other at their inner ends to adapt them to receive the plow-beams and draft, as and for the purpose set forth.

TOTTEN POLING.

Witnesses:
 HENRY S. HALLECK,
 SAMUEL LEWIS.